US 6,639,522 B2

(12) United States Patent
Derderian

(10) Patent No.: US 6,639,522 B2
(45) Date of Patent: Oct. 28, 2003

(54) SYSTEM AND METHOD OF AUTOMATICALLY TRIGGERING EVENTS SHOWN ON AIRCRAFT DISPLAYS

(75) Inventor: Ara Derderian, Trabuco Canyon, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/791,100

(22) Filed: Feb. 22, 2001

(65) Prior Publication Data

US 2002/0113720 A1 Aug. 22, 2002

(51) Int. Cl.[7] ............................................. G08B 21/00
(52) U.S. Cl. ....................................... 340/945; 340/971
(58) Field of Search .............................. 340/945, 963, 340/964, 971

(56) References Cited

U.S. PATENT DOCUMENTS

| | | | | |
|---|---|---|---|---|
| 5,587,904 A | * | 12/1996 | Ben-Yair et al. ............ | 701/213 |
| 5,627,546 A | * | 5/1997 | Crow .......................... | 342/352 |
| 6,177,887 B1 | * | 1/2001 | Jerome ........................ | 340/945 |
| 6,278,965 B1 | * | 8/2001 | Glass et al. ................... | 703/22 |
| 6,380,869 B1 | * | 4/2002 | Simon et al. ................ | 340/945 |

\* cited by examiner

*Primary Examiner*—Daryl Pope
(74) *Attorney, Agent, or Firm*—Nathan O. Jensen; Kyle Eppele

(57) ABSTRACT

An information display method and system on board a passenger aircraft for automatically choreographing material to be presented throughout a journey of the aircraft. The method includes reading and parsing a string file of event triggers retrieved from a configuration file and sequentially determining if one of the triggers is to be activated by comparing it with navigational data of the aircraft. If the subject trigger is to be activated the system takes the action dictated by this trigger. All of the preceding steps are repeated throughout the journey of the aircraft. The system includes a configuration file for storing a plurality of the event triggers and screen formats for displaying flight information. The configuration file also stores a plurality of display modes, each mode representing a specific sequence of preselected display screen formats, with each display mode corresponding to an event trigger.

12 Claims, 4 Drawing Sheets

SYSTEM AND METHOD OF AUTOMATICALLY TRIGGERING EVENTS SHOWN ON AIRCRAFT DISPLAYS

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates to a method and system for managing a passenger aircraft's journey by automatically choreographing information and entertainment material to be presented throughout the journey.

2. Description of Related Art

Display systems relating to passenger aircraft are a relatively recent innovation. One example of such a system is disclosed in U.S. Pat. No. 4,975,696, entitled REAL-TIME AND DESTINATION DISPLAY FOR AIRCRAFT PASSENGERS. This patent discloses a video display system in the passenger compartment of an aircraft where instructive and entertaining information is displayed to the passengers. Examples of information provided by the system disclosed in this patent are aircraft ground speed, outside temperature and altitude, among other information of interest, as sensed by the aircraft's navigation and air data systems. It stores a plurality of charts representing terminals at airports at which the aircraft may land. These charts are displayed, as appropriate, over the aircraft's video display system upon receipt of information regarding flight number, destination airport and arrival gates, along with other information.

Another example of a prior art system is disclosed in U.S. Pat. No. 5,208,590, entitled FLIGHT PHASE INFORMATION DISPLAY SYSTEM FOR AIRCRAFT PASSENGERS. This patent relates to video display systems in the passenger compartment of aircraft wherein instructive and entertaining information are displayed to customers. First, a determination of the flight phase is made from the aircraft's navigation and air data systems. For each phase of the flight plan, a different sequence of information is displayed. Thus, for example, during takeoff the system may display a map showing the flight plan of the aircraft, whereas during the descent, the system may alternately display the distance to destination and time to destination. Other relevant information may also be displayed, such as altitude, ground speed, outside temperature, etc.

Several other types of systems are available for distributing audio, video and data signals to passengers on airlines, which signals are received from satellites while the airliner is in motion. One such example is disclosed in U.S. Pat. No. 5,760,819, entitled Distribution of a Large Number of Live Television Programs to Individual Passengers in an Aircraft. The system disclosed in this patent provides distribution of live television programming within an aircraft to each passenger seat, where each passenger may individually select from many channels. Another prior art system is disclosed in U.S. Pat. No. 5,790,175 entitled Aircraft Satellite Television System for Distributing Television Programming Derived from Direct Broadcast Satellites. The system disclosed in this patent includes an antenna disposed on the aircraft, which is pointed at a plurality of satellites that are part of a direct broadcast satellite system. The antenna is controlled by an antenna controller and antenna interface unit that send control signals and process status signals to steer the antenna.

Yet another prior art system is disclosed in U.S. Pat. No. 5,801,751 entitled Distribution of Satellite Television Programs to Passengers in an Aircraft when it is out of Range of the Satellites. The system disclosed in this patent is very similar in construction to those described above. The passengers are provided with live television programming when the aircraft is in the coverage area of the satellite, and time-delayed television programming during that portion of the flight when the aircraft is out of the coverage area of the satellites.

Still another prior art system is disclosed in U.S. Pat. No. 5,929,895 entitled Low Cost Hybrid Video Distribution System for Aircraft In-Flight Entertainment Systems. This patent teaches a system wherein a single tuner serves a group of seats. For example, one tuner may service up to 48 seats. All channels are provided from this tuner to each of the 48 seats so that a passenger may select a desired channel.

Therefore, a need exists to automate actions and events with an aircraft display system based on data from the aircraft's navigational system, which include such things as playing safety briefings on display monitors, turning in-seat power on and off, and displaying relevant content on the aircraft's display system.

SUMMARY OF THE INVENTION

It is therefore an object of the present invention to provide an improved system and method for automatically displaying information to passengers in an aircraft.

Another object of the present invention is to automate actions and events with an aircraft display system based on data from the aircraft's navigational system.

Still another object of the present invention is to provide a method for automatically playing safety briefings on display monitors in a passenger aircraft, turning in-seat power on and off, and displaying relevant content on the aircraft's display system.

A feature of the present invention is the use of a series of event triggers that are organized sequentially in the order of normal occurrence during an aircraft's journey.

Another feature of the present invention is the ability to place calls to a central operation center to obtain current content for display to the passengers of an aircraft.

Yet another feature of the present invention is the use of a configuration file, which may include a CD-ROM for example, for storing the multiplicity of event triggers.

Still another feature of the present invention is a simplified technique to make changes to the configuration file, which obviates the need to change the software for the system when changes are made.

These and other objects, which will become apparent as the invention is described in detail below, are provided by an information display method and system on board a passenger aircraft for automatically choreographing material to be presented throughout a journey of the aircraft. The method includes reading and parsing a string file of event triggers retrieved from a configuration file and sequentially determining if one of the triggers is to be activated by comparing it with navigational data of the aircraft. If the subject trigger is to be activated the system takes the action dictated by this trigger. All of the preceding steps are repeated throughout the journey of the aircraft. The system includes a configuration file for storing a plurality of the event triggers and screen formats for displaying flight information. The configuration file also stores a plurality of display modes, each mode representing a specific sequence of preselected display screen formats, with each display mode corresponding to an event trigger.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

The general purpose of this invention, as well as a preferred mode of use, its objects and advantages will best be understood by reference to the following detailed description of an illustrative embodiment with reference to the accompanying drawings in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an enhanced real-time flight information display system for aircraft passengers.

Journey management is the concept of automatically choreographing information and entertainment material to be presented throughout the aircraft's journey. From takeoff to landing, the system of the present invention will provide sights and sounds that will inform and entertain the passengers. From the moment the passenger boards the aircraft they are greeted with a welcome aboard message. After take-off, the system displays maps, short subject programs, advertisements, financial and headline news, sports, destination weather, arrival video, and connecting gate information; all automatically triggered according to a predefined set of events. In order to automate the system of the present invention numerous trigger conditions are offered, which may be tailored to the airline's requirements.

Figure 1:
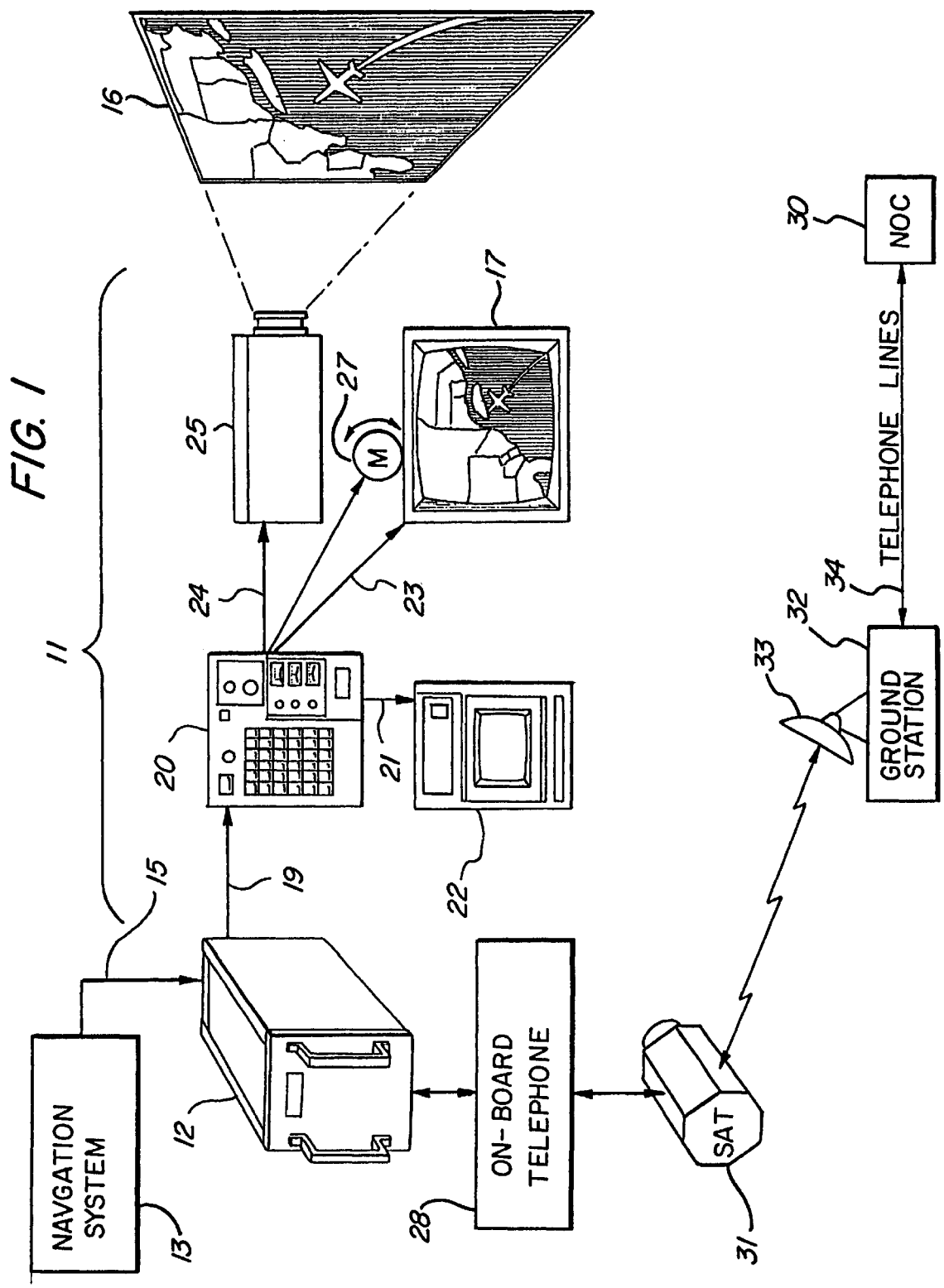
FIG. 1 illustrates a block diagram, somewhat in pictorial form, of an aircraft video display system utilizing the present invention.

Referring now to the drawings and FIG. 1 in particular, an exemplary on-board system 11 for displaying information to aircraft passengers is illustrated. A data processor 12 receives flight information data from the aircraft's navigation system 13, which data are transmitted over a bus 15. Each of these systems from which data are received is entirely conventional and will not be described further.

The data processor 12 utilizes the received flight information from the navigation system 13, including among other things the aircraft's location, air speed, altitude, the time of day and elapsed time since take-off to determine when certain events are to be displayed on a screen 16 or a monitor 17. It is pointed out that there may be more than one screen 16, such as that found on large passenger aircraft, or a multiplicity of monitors 17 located throughout the cabin on smaller passenger aircraft. Also, the data processor 12 contains a configuration file, which will be explained further hereinafter, that contains a prescribed sequence of events that may occur during a flight. For example, during taxi and before take-off, or during descent and before landing, FAA mandated safety instructions are displayed on the screen 16 or monitors 17 (including an audio track) informing the passengers of emergency procedures and exits, etc. Another example may be that periodically the display will illustrate the location of the aircraft with reference to the ground, as shown in FIG. 1 on the screen 16 and monitor 17, including a display of ground speed, outside temperature, etc.

After processing the received information and generating display screens tailored to the elapsed time of the flight plan, data processor 12 transmits the displays over link line 19 to a conventional video selector unit 20 that routes the information to the screen 16 or monitor 17. For example, the information may be transmitted over link lines 21 to a preview monitor 22, or over link lines 23 to the monitor 17, or over link lines 24 to a video projector 25, which projects the sequences of displays received onto the video screen 16. A link line 26 directs signals to a motor 27 that rotates the monitor 17 down for display or up and out of the way when not in use.

The data processor 12 has the capability, as will be amplified hereinafter, to place and receive phone calls via an on-board telephone 28 to a central station 30 for the purpose of receiving requested information, such as stock quotes, sports scores, news updates, etc. The connection between the on-board telephone 28 and the central station 30 is effected via a satellite 31 communicating with a ground station 32 having a dish antenna 33 and telephone lines 34 connecting to the central station 30.

Figure 2:
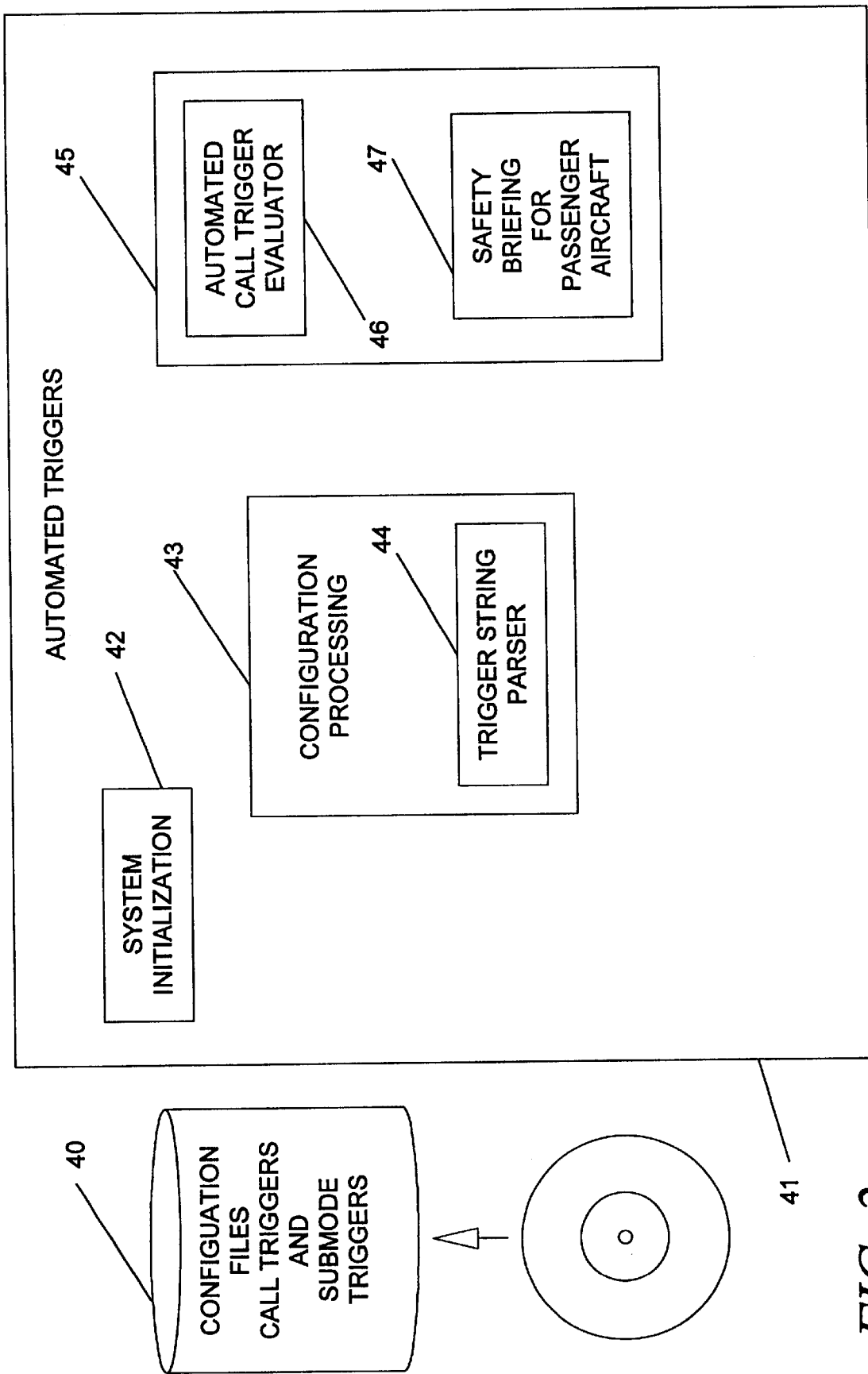
FIG. 2 is a block diagram of the software modules implementing the method of the present invention.

Referring now to FIG. 2, a block diagram illustrates the software modules executed by the data processor 12 to accomplish the above-described operations. Configuration files 40 contain a prescribed set of triggers, which when certain conditions are met will "trigger" an event. For example, one trigger may be to display a safety message. When the elapsed time of the journey is between zero and ten minutes, for example, a trigger for this event will start the safety message display. Another trigger may be for example, if the aircraft crosses the equator (as determined by the aircraft's navigation system 13) then a display will appear on the screen 16 or monitors 17 announcing this event.

Example Trigger Strings are listed in Appendix II, with definitions of terms used set forth in Appendix I hereof, which appendices are made a part hereof. With reference to the triggers set forth in Appendix II, the first trigger CALLTRIGGER, 10, "TSD25 25*" refers to the automatic placement of a telephone call 25 minutes after departure. A call profile 10 will be transmitted from the aircraft to the NOC 30, which is pre-arranged with the NOC to contain specific information. All aircraft for this customer transmitting profile 10 will receive the same information back from the NOC 30 in response to this call. Most airlines have aircraft flying to all corners of the world and thus want information to be relevant to the routes flown. Furthermore, aircraft routes can change as equipment availability changes. There must be a way for an aircraft flying to Asia one week and then to Europe the next to be able to retrieve information for those routes. This problem is solved with the Trigger Evaluator of the present invention and the flexibility of using a CD-ROM 39 to store this information. The airline can configure profiles based on routes and let the aircraft decide which profile is required. The following example will better explain:

CALLTRIGGER, 10, "AND TSD 25 DEPT GRP1 *"
CALLTRIGGER, 11, "AND TSD 25 DEPT GRP2 *"
CALLTRIGGER, 12, "AND TSD 25 DEPT GRP3 *"
CALLTRIGGER, 13, "AND TSD 25 DEPT GRP4 *"

Where, for example, GRP 1 is European Cities, GRP 2 Asian, GRP 3 North American, and GRP 4 South American. Groups are set up by the airlines. It follows from this then that the airline can arrange the city grouping in anyway they deem appropriate, and they have the flexibility of making these changes by using different CD-ROM's 39 without the need to change the software.

The four ASCII trigger strings get parsed and turned into binary strings. These binary strings are constantly being fed into a trigger evaluator to determine if action is to be taken, which will be amplified hereinafter. In the above example, there are four events that are possible 25 minutes after departure. However, there is another criterion for making the automated call, i.e., the departure point. If the departure city is in one of the groupings it will evaluate to true and make the call with the proper call profile. If next week the aircraft is flying in another region of the world it will automatically select the correct call profile for that region. In the prior art systems there was no way to differentiate routes.

CALLTRIGGER, 11, "AND (AND (AND (NOT TTD 170) TTD 180) TSLC 120) DEST GRP1) *"

This example is more complex and shows the power of the trigger evaluator. A telephone call is made with profile 11 if the aircraft is between 2:50 and 3:00 hours of the destination and the last call was made more than two hours ago and flying to Europe (See above for GRP definitions). The TSLC (Time Since Last Call) prevents an additional telephone call from being made on short flights (like a three to four hour flight) since the data is still fresh. This saves the airline money by reducing redundant calls. In prior art systems the times for making calls were fixed and two calls would be made regardless of the time of the previous call.

BRIEFING, "AND(AC 767 GS 10)*"

The example above searches a database of briefings and plays the appropriate one once the Ground Speed (GS) reaches 10 Knots. In the above example the 767 briefing is displayed on the screens throughout the aircraft. Currently, airlines must make sure that the correct video is onboard the aircraft. This method would allow for one media on all aircraft and allow the trigger string to make the decision as to which one gets selected.

SCRNDISP, "TTD 30 *", 65535

This example displays a screen 30 minutes prior to landing and will display it indefinitely. In previous systems there was no way to selectively display content within the phases of flight. If something was configured to display in cruise it displayed while the aircraft was in cruise mode. The trigger evaluator 54 of the present invention allows airlines to further subdivide the phases of flight. This screen could be information about connecting gates. It would only have value towards the end of the flight. Airlines could put customs information that would come up just prior to landing. This would all happen automatically and reduce the burdens of the flight crew.

Within a portion of memory storing the programs for the data processor 12 is a block labeled Automated Triggers 41. Within this portion there is a routine for System Initialization 42 and another for Configuration Processing 43, including a Trigger String Parser 44. Also included within the Automated Triggers portion 41 are an Automated Call Trigger Evaluator 46 and a Safety Briefing for Passenger Aircraft 47. The Automated Call Trigger Evaluator 46 implements the placing of calls to the NOC 30 at pre-set times. For example, one might program for receiving periodic updates to the stock market, or news updates, or sports scores, etc.

Figure 3A:
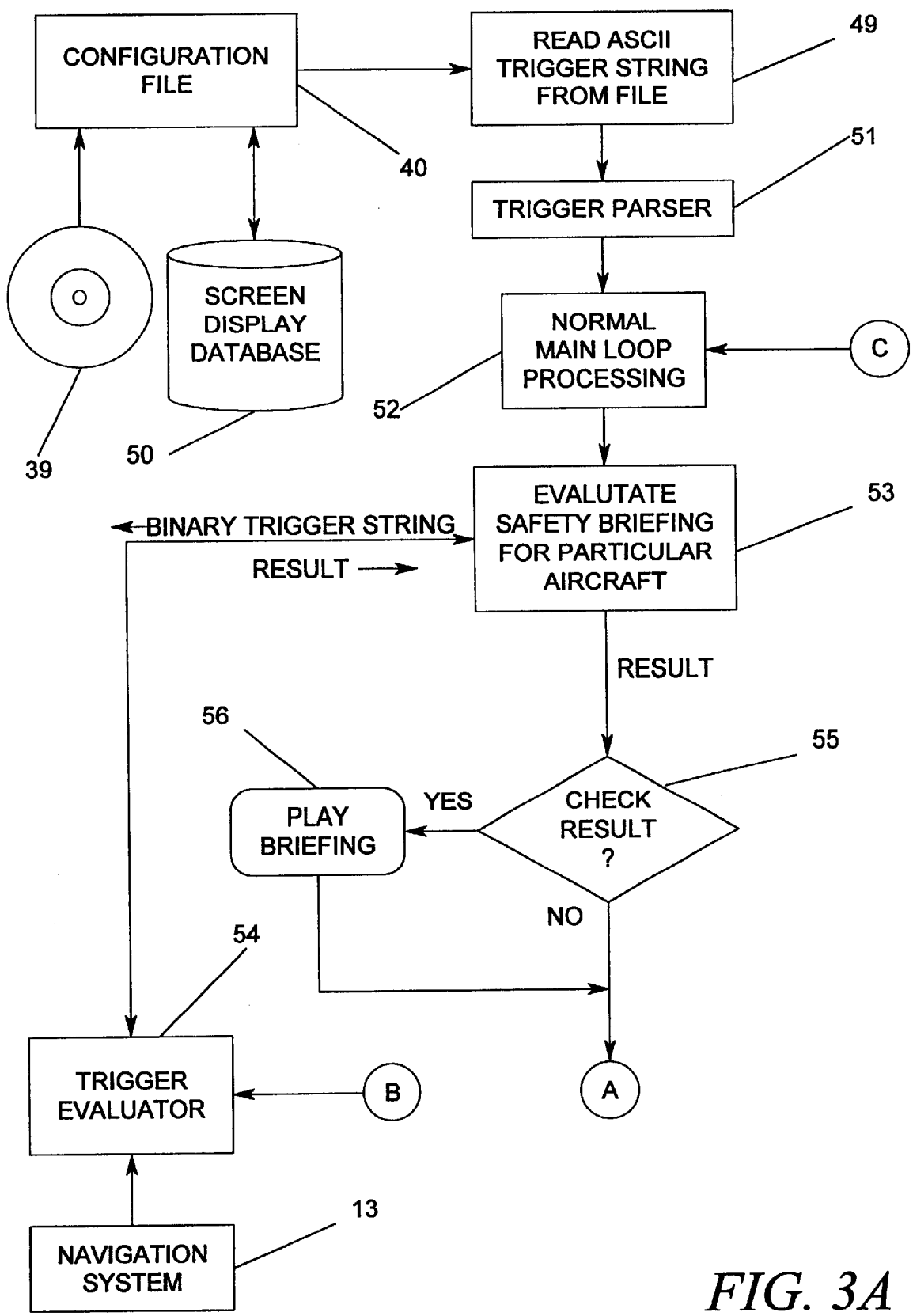
FIGS. 3A and 3B combined are a flow chart illustrating the method of the present invention.

Referring now to FIG. 3A, a flow chart of the process of the present invention is shown. The process begins with the reading of ASCII Trigger Strings from the Configuration Files 40 (block 49), which accesses display data from a screen display database 50 and the CD-ROM 39. Next, the Trigger is parsed (block 51) for reading by the data processor 12. After this, entry is made into the main loop processing (block 52). An evaluation is next made if the Trigger relates to a Safety Briefing for a Particular Aircraft (block 53), by applying the binary trigger string to a Trigger Evaluator 54, which performs a comparison operation and determines if this is the time for this trigger. A result of this operation is then sent back to the block 53 for implementation. Note that the Trigger Evaluator 54 receives status information from the Aircraft Navigation System 13, which includes position and time data. The result of the evaluation in the block 53 is verified before display (diamond 55). If the verification is yes or true, then the Briefing is played (screen 56). On the other hand, if conditions are not met at this time (e.g., not the time for a Safety Briefing), or once the screen 56 has played, then a branch is made to the next sheet of the drawings as depicted by a connector A.

Figure 3B:
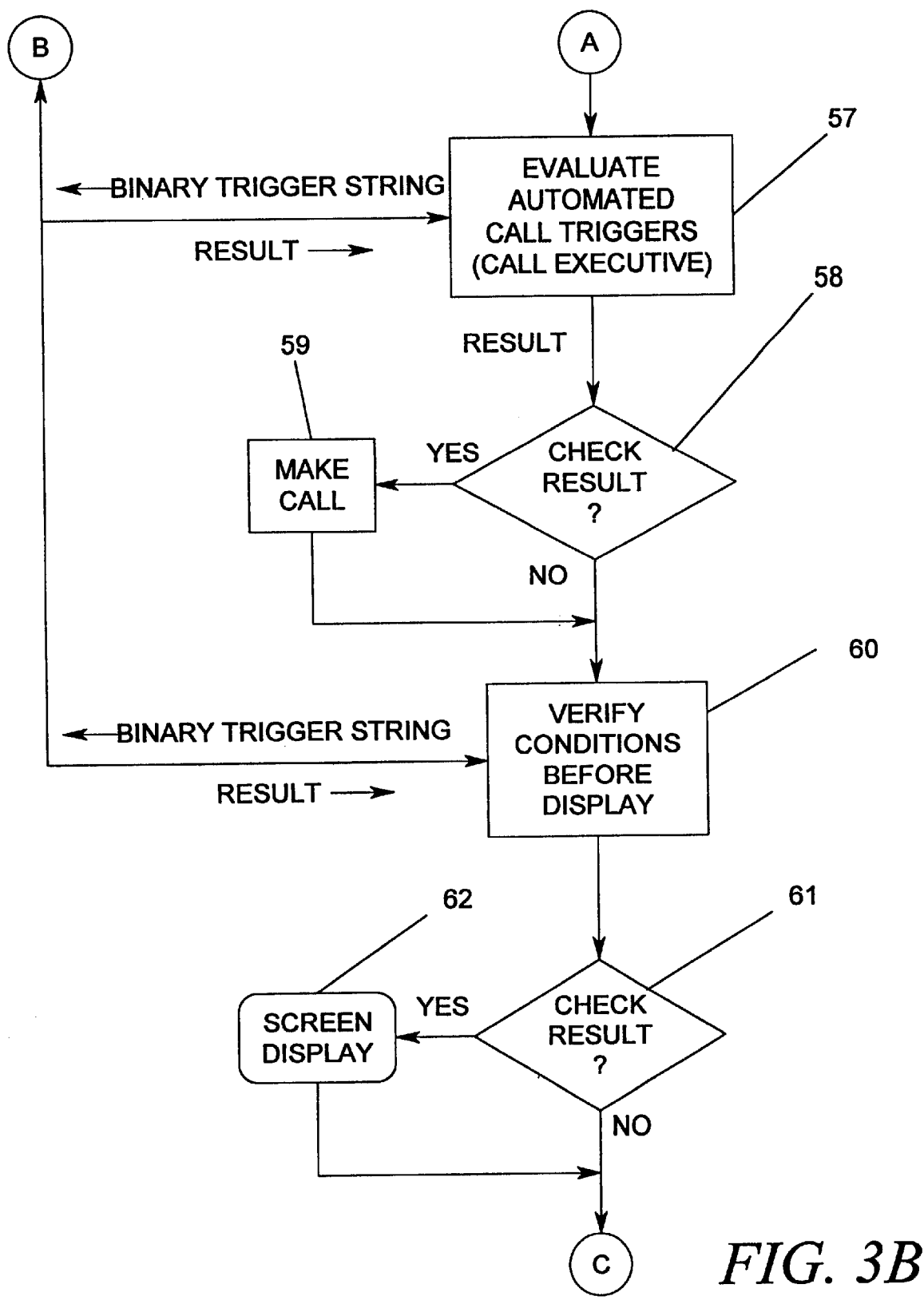

Referring now to FIG. 3B at the connector A, an evaluation is made if a trigger relates to an Automated Call Executive (block 57). Again, a binary trigger string is sent to the Trigger Evaluator 54 (connector B to FIG. 3A) to determine if conditions are met for a particular trigger, then a result is returned to the block 57 from the trigger evaluator 54. A verification of the result of the evaluation is next made (diamond 58). If the answer is yes or true, then a call is made to the NOC 30 via the On-board Telephone 28 (block 59). After this, a verification is made as to whether or not the conditions are met before displaying the call result (block 60), which operation is coordinated by the Trigger Evaluator 54. That is, a binary trigger string is sent to the trigger evaluator 54 and a result is returned therefrom. The result is again verified (diamond 61). If the answer to this verification is yes or true, then a display is made of the call results (screen 62). After this, or if the verification is no or false, a return is made back to the normal main loop processing (block 52, FIG. 3A) as denoted by a connector C. This process is repeated throughout the journey of the aircraft.

While the invention has been particularly shown and described with reference to a preferred embodiment, it will be understood by those skilled in the art that various changes in form and detail may be made therein without departing from the spirit and scope of the invention.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

Appendix I

Trigger Tokens (Not Limiting)

Logical Operations:
 NOT, XOR, OR, AND
Departure & Destination:
 DEST (Destination) DEPT (Departure)
Distance:
 DTD (Distance to Destination) DFD (Distance from Departure)
Time Based:
 TTD (Time to Destination) TSD (Time since Departure) TSLC (Time Since Last Call) PHSTIME (Time in Phase)
Speed:
 GS (Ground Speed)
Altitude:
 AL (Altitude)
Flight Phase:
 FLIPHS (Flight Phase) PHSTIME (Time in Phase (Repeated from above))
ACARS:
 ADEST (ACARS Destination)
Position:
 POI (Point of Interest) PRAL (Position Range Altitude PR (Position Range) LOC (Location)
Time of Day and Date:
 GMTT (GMT Time) GMTD (GMT Date)
Language:
 LANG (Language)

Appendix II

EXAMPLES

Configure a call with profile 10, 25 minutes after take off:
 CALLTRIGGER, 10, "TSD 25 *"
Configure a call with profile 11 between 180 and 170 minutes TTD and 120 minutes since the last call:
 CALLTRIGGER, 11, "AND(AND((NOT TTD 170) TTD 180) TSLC 120) *"
Configure a call with profile 11 between 180 and 170 minutes TTD and 120 minutes since the last call and the Destination is in Group List 1.
 CALLTRIGGER, 11, "AND(AND(AND((NOT TTD 170) TTD 180) TSLC 120) DEST GRP 1)*"
Configure a safety briefing to play on 767 aircraft when ground speed is greater than 10 knots (Future Capability).
 BRIEFING, "AND(AC 767 GS 10)*"
Configure a sub mode to display with TTD 30 minutes or less indefinitely.
 SCRNDISP, "TTD 30 *", 65535

What is claimed is:

1. A computer implemented information display system on board a passenger aircraft for automatically choreographing material to be presented throughout a journey of said aircraft, said system comprising:

a. a configuration file for storing a plurality of event triggers and display screen formats for displaying flight information, and for storing a plurality of display modes, each mode representing a specific sequence of preselected display screen formats, with each display mode corresponding to an event trigger;

b. a configuration processing unit for retrieving triggers from said configuration file and parsing the same for reading by a data processor;

c. an automated trigger evaluator responsive to an aircraft navigation system of said passenger aircraft for determining the time for activation of each trigger; and, d. an automated evaluation unit responsive to said automated trigger evaluator for activating display information retrieved from said configuration file.

2. The system as in claim 1 wherein said configuration file includes a screen display database.

3. The system as in claim 1 wherein said automated evaluation unit includes a safety briefing for said passenger aircraft.

4. The system as in claim 1 wherein said automated evaluation unit includes a call executive.

5. The system as in claim 4 wherein said call executive includes a telephone link with a ground station for relaying current information to said passenger aircraft.

6. The system as in claim 1 wherein said configuration file includes a CD-ROM containing said triggers.

7. A information display system on board a passenger aircraft having a computer for automatically choreographing material to be presented throughout a journey of said aircraft, said computer adapted for receiving data from a navigational system of said aircraft, said system comprising:

a. a configuration file for storing a plurality of event triggers and display screen formats for displaying flight information, and for storing a plurality of display modes, each mode representing a specific sequence of preselected display screen formats, with each display mode corresponding to an event trigger;

b. a configuration processing unit for retrieving triggers from said configuration file and parsing the same for reading by a data processor;

c. an automated trigger evaluator responsive to said aircraft navigation system of said aircraft for determining the time for activation of each trigger; and, d. an automated evaluation unit responsive to said automated trigger evaluator for activating display information retrieved from said configuration file.

8. The system as in claim 7 wherein said configuration file includes a screen display database.

9. The system as in claim 7 wherein said automated evaluation unit includes a safety briefing for said passenger aircraft.

10. The system as in claim 7 wherein said automated evaluation unit includes a call executive.

11. The system as in claim 10 wherein said call executive includes a telephone link with a ground station for relaying current information to said passenger aircraft.

12. The system as in claim 7 wherein said configuration file includes a CD-ROM containing said triggers.

* * * * *